US007209962B2

(12) United States Patent
Boden

(10) Patent No.: US 7,209,962 B2
(45) Date of Patent: Apr. 24, 2007

(54) SYSTEM AND METHOD FOR IP PACKET FILTERING BASED ON NON-IP PACKET TRAFFIC ATTRIBUTES

(75) Inventor: Edward B. Boden, Vestal, NY (US)

(73) Assignee: International Business Machines Corporation, Armonk, NY (US)

(*) Notice: Subject to any disclaimer, the term of this patent is extended or adjusted under 35 U.S.C. 154(b) by 772 days.

(21) Appl. No.: 09/919,185

(22) Filed: Jul. 30, 2001

(65) Prior Publication Data

US 2003/0028674 A1 Feb. 6, 2003

(51) Int. Cl.
*G06F 15/173* (2006.01)
(52) U.S. Cl. .................................. 709/223; 709/230
(58) Field of Classification Search ............... 709/223, 709/224, 230, 232, 234–236
See application file for complete search history.

(56) References Cited

U.S. PATENT DOCUMENTS

| 5,720,033 A | | 2/1998 | Deo ........................... 395/186 |
| 5,835,726 A | * | 11/1998 | Shwed et al. ............... 709/229 |
| 5,835,727 A | * | 11/1998 | Wong et al. ................ 709/238 |
| 5,848,233 A | | 12/1998 | Radia et al. ........... 395/187.01 |
| 5,864,666 A | | 1/1999 | Shrader .................. 395/187.01 |
| 5,950,195 A | * | 9/1999 | Stockwell et al. .......... 709/229 |
| 5,958,010 A | * | 9/1999 | Agarwal et al. ............ 709/224 |
| 6,009,475 A | | 12/1999 | Shrader ....................... 709/249 |
| 6,076,168 A | * | 6/2000 | Fiveash et al. ............. 713/201 |
| 6,131,163 A | * | 10/2000 | Wiegel ....................... 713/201 |
| 6,141,686 A | * | 10/2000 | Jackowski et al. .......... 709/224 |
| 6,147,976 A | * | 11/2000 | Shand et al. ................ 370/254 |
| 6,182,139 B1 | * | 1/2001 | Brendel ...................... 709/226 |
| 6,182,228 B1 | * | 1/2001 | Boden et al. ............... 709/227 |
| 6,219,786 B1 | * | 4/2001 | Cunningham et al. ...... 709/229 |
| 6,233,686 B1 | * | 5/2001 | Zenchelsky et al. ........ 713/201 |
| 6,253,321 B1 | * | 6/2001 | Nikander et al. ........... 713/160 |
| 6,266,707 B1 | * | 7/2001 | Boden et al. ............... 709/232 |
| 6,301,669 B2 | * | 10/2001 | Boden et al. ............... 709/227 |

(Continued)

FOREIGN PATENT DOCUMENTS

JP 1085442 3/1989

(Continued)

OTHER PUBLICATIONS

Engler, Dawson R.; Kaashoek, M. Frans; O'Toole Jr., James, "Exokernel: An Operating System Architecture for Application-Level Resource Management," Proceedings of the Fifteenth ACM Symposium on Operating Systems Principles SOSP 1995, ACM SigOps Operating Systems Review, ACM Press, Dec. 1995, vol. 29, Issue 5, pp. 251-266.*

(Continued)

*Primary Examiner*—Bunjob Jaroenchonwanit
*Assistant Examiner*—Victor Lesniewski
(74) *Attorney, Agent, or Firm*—Shelley Beckstrand

(57) ABSTRACT

Control and management of communication traffic. IP packet filtering occurs in an operating system kernel implementation of, for example, the TCP/IP protocol suite. Access rules are expressed as filters referencing system kernel data; for outbound processing, source application indicia is determined; for inbound packet processing, a look-ahead function is executed to determine target application indicia; and responsive to the source or target application indicia, filter processing is executed.

39 Claims, 6 Drawing Sheets

U.S. PATENT DOCUMENTS

| | | | |
|---|---|---|---|
| 6,330,562 B1* | 12/2001 | Boden et al. | 709/220 |
| 6,453,345 B2* | 9/2002 | Trcka et al. | 709/224 |
| 6,510,509 B1* | 1/2003 | Chopra et al. | 709/236 |
| 6,615,357 B1* | 9/2003 | Boden et al. | 709/238 |
| 6,643,776 B1* | 11/2003 | Boden et al. | 709/224 |
| 6,675,218 B1* | 1/2004 | Mahler et al. | 709/230 |
| 6,717,949 B1* | 4/2004 | Boden et al. | 370/401 |
| 6,738,377 B1* | 5/2004 | Boden | 370/392 |
| 6,738,909 B1* | 5/2004 | Cheng et al. | 709/223 |
| 6,772,347 B1* | 8/2004 | Xie et al. | 726/11 |
| 6,832,260 B2* | 12/2004 | Brabson et al. | 709/230 |
| 6,832,322 B1* | 12/2004 | Boden et al. | 726/15 |
| 6,868,450 B1* | 3/2005 | Lucovsky | 709/229 |
| 6,978,308 B2* | 12/2005 | Boden et al. | 709/229 |
| 6,993,037 B2* | 1/2006 | Boden et al. | 370/401 |
| 7,099,319 B2* | 8/2006 | Boden et al. | 370/389 |
| 7,107,614 B1* | 9/2006 | Boden et al. | 726/15 |
| 2003/0217130 A1* | 11/2003 | Tang et al. | 709/223 |
| 2005/0021680 A1* | 1/2005 | Ekis et al. | 709/219 |

FOREIGN PATENT DOCUMENTS

| | | |
|---|---|---|
| JP | 10242976 | 9/1998 |
| JP | 11308272 | 5/1999 |
| JP | 2000151671 | 5/2000 |
| WO | WO 00/008817 | 2/2000 |

OTHER PUBLICATIONS

Wallach, Deborah A.; Engler, Dawson R.; Kaashoek, M. Frans, "ASHs: Application-Specific Handlers for High-Performance Messaging," Conference Proceedings on Applications, Technologies, Architectures, and Protocols for Computer Communications, ACM SigComm Computer Communication Review, ACM Press, Aug. 1996, vol. 26, Issue 4, pp. 1-13.*

Sahasranaman, Vivek; Buddhikot, Milind M., "Comparative Evaluation of Software Implementations of Layer-4 Packet Classification Schemes," IEEE, Ninth International Conference on Network Protocols, Nov. 11-14, 2001, pp. 220-228.*

Ioannidis, S.; Anagnostakis, K.G.; Ioannidis, J.; Keromytis, A.D., "xPF: Packet Filtering for Low-Cost Network Monitoring," IEEE, Workshop on High Performance Switching and Routing, Merging Optical and IP Technologies, May 26-29, 2002, pp. 116-120.*

T. Miei et al. Parallelization of IP-packet filter rules. 1997 3rd International Conference on Algorithms and Architectures for Parallel Processing, Singapore ISBN 0780342291. Inspec ABN C9804-6150C-003.

T. Chiueh, et al. Performance Optimization of Internet Firewalls. Proceedings of the SPIE—The International Society for Optical Engineering, vol. 2915, pp. 168-173, 1997. Inspec ABN B9705-6210L-075; C9705-6130S-021.

S. Hazelhurst, et al. Algorithms for Improving the Dependability of Firewall and Filter Rule Lists. Proceeding International Conference on Dependable Systems and Networks, published: Los Alamitos, CA. ISBN 0769507077. Inspec ABN B2000-09-6150P-031; C2000-09-6130S-084.

Tyc Woo. A Modular Approach to Packet Classification: Algorithms and Results. Proceedings IEEE INFOCOM 2000. Conference on Computer Communications. Nineteenth Annual Joint Conference of the IEEE Computer and Communications Societies (Cat. No. 00CH37064), V.3 pp. 1213-1222. ISBN 0780358805 Inspec ABN B2000-05-6150-024.

A. Hari, et al. Detecting and Resolving Packet Filter Conflicts. Proceedings IEEE INFOCOM 2000, vol. 3 pp. 1203-1212. Piscataway, NJ. ISBN 0780358805. Inspec ABN B2000-05-6150P-027; C2000-05-5620W-056.

* cited by examiner

SYSTEM AND METHOD FOR IP PACKET FILTERING BASED ON NON-IP PACKET TRAFFIC ATTRIBUTES

BACKGROUND OF THE INVENTION

1. Technical Field of the Invention

This invention pertains to control and management of communication traffic. More specifically, it relates to the use of filtering in the control and management of communication traffic.

2. Background Art

Referring to FIG. 1 in connection with FIG. 2, in a network system including two nodes 30, 32 connected by, for example, the Internet 40, the nodes are typically connected through router 35, 37 firewalls 36, 38, respectively. The case is commonly encountered where traffic between nodes 30, 32 is to be restricted based on something other than data in the packet 140. For most business, not all applications are created equal: some data deal with sensitive matters, and usage is restricted to groups or individuals. There is, in this instance, a need to restrict certain types of traffic by group or application, and the data required to do so is typically not available in packet 140.

Internet protocol (IP) packet filtering, in the context of the TCP/IP protocol suite, is the base technology commonly implemented in firewalls 36, 38 and related systems. It is important for network integrity and security. Virtual private network (VPN) technology based on the Internet protocol security (IPsec) protocols also utilizes packet filtering. VPNs are an important enabler for e-business, both for consumer-to-business (C2B) and business-to-business (B2B) activity.

C2B and B2B applications of VPN technology today must rely on attributes actually contained within the IP packets 140 for their security, or be handled at the application level. This is because IP packet filtering is done based on data actually contained within the datagram 140, either the IP header 142, ULP headers 144, or possibly, the payload portion 154 of the packet.

Since packet filtering does not provide the necessary capabilities, if additional control and management of aspects of communication traffic are necessary, three techniques are used: (1) application level control, (2) proxy server control, or (3) add packet data control. According to (1), controls are built into the application, such as server application 42. In this case, server application 42 includes configuration capability to control its traffic based on user ID or profile. For example, individual applications 42 may have their own user authorization lists or exit programs allowing control over what users may do. This approach is not centralized and is not standard. Each application may do control differently, and each application must be configured. According to (2), a proxy server 34 controls applications that go into a node 30 from node 32. An application or set of applications or servers is be 'front-ended' by a proxy server 34 which intercepts traffic for its configured applications and performs checking on what users may access. Proxy server 34 creates what looks like node 30, to node 32, but passes through to node 30 only authorized traffic, other traffic being blocked or discarded with, perhaps, an error message. This technique centralizes things somewhat, but has performance problems because traffic comes in from router 35 and up through the stack to an application layer, the proxy 34 has to pretend that it is an application, and then send data back down the stack, and the real server 30 must do the same. Both techniques (1) and (2) address the problem of data required for control logic in the application not existing in the datagram (aka packet), so the control decision is moved up in the application layer where the required data normally resides. The application layer typically knows the user ID which is requesting data. According to (3), additional required data 152 is added in the packet 140, and this allows filter rules to be written. Thus, application level information 152 may be added to a variety of IP packets 140, so that these decisions can be made about the traffic. However, this makes the packets non-standard, in the sense that these special headers require special function associated with the stack.

The above control and management techniques have various deficiencies, including lack of centralized control when spread over multiple applications and servers, increased overhead when the entire protocol stack must be traversed by IP packet traffic in the case of application control 42 or proxy servers 34, lack of consistency when applying control files, authorization lists, etc. for different applications or servers from different vendors, and lack of security.

It is an object of the invention to provide an improved system and method for control and management of aspects of communication traffic.

It is a further object of the invention to provide a system and method for control and management of aspects of communication traffic within filtering.

It is a further object of the invention to provide a system and method for centralizing communication management and control within filter rules.

It is a further object of the invention to provide a system and method having reduced overhead for controlling and managing communication traffic, without requiring that IP packet traffic traverse the entire protocol stack to be disallowed.

It is a further object of the invention to provide a system and method having improved consistency, with all the rules for access expressed in the same way.

It is a further object of the invention to provide a system and method for managing and controlling communication traffic having improved security through visibility and coherence by centralizing the access rules and centralizing associated logging.

SUMMARY OF THE INVENTION

A system and method for control and management of communication traffic. Access rules are expressed as filters referencing system kernel data; for outbound processing, source application indicia is determined; for inbound packet processing, a look-ahead function is executed to determine target application indicia; and responsive to the source or target application indicia, filter processing is executed.

In accordance with an aspect of the invention, there is provided a computer program product configured to be operable to control and manage communication traffic, according to the steps of expressing access rules as filters referencing system kernel data; for outbound processing, determining source application indicia; for inbound packet processing, executing a look-ahead function to determine target application indicia; and responsive to said source or target application indicia, executing filter processing.

Other features and advantages of this invention will become apparent from the following detailed description of the presently preferred embodiment of the invention, taken in conjunction with the accompanying drawings.

BEST MODE FOR CARRYING OUT THE INVENTION

Figure 3:
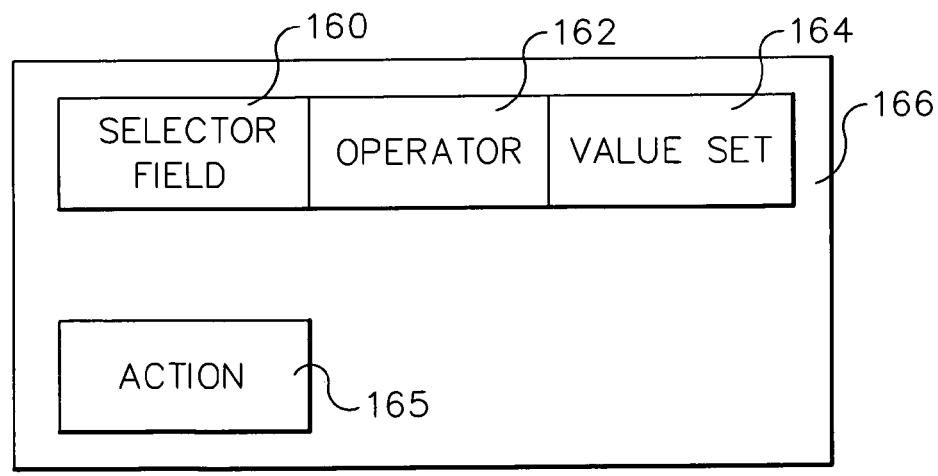
FIG. 3 illustrates the format of a filter statement in accordance with a preferred embodiment of the invention.
Figure 4:
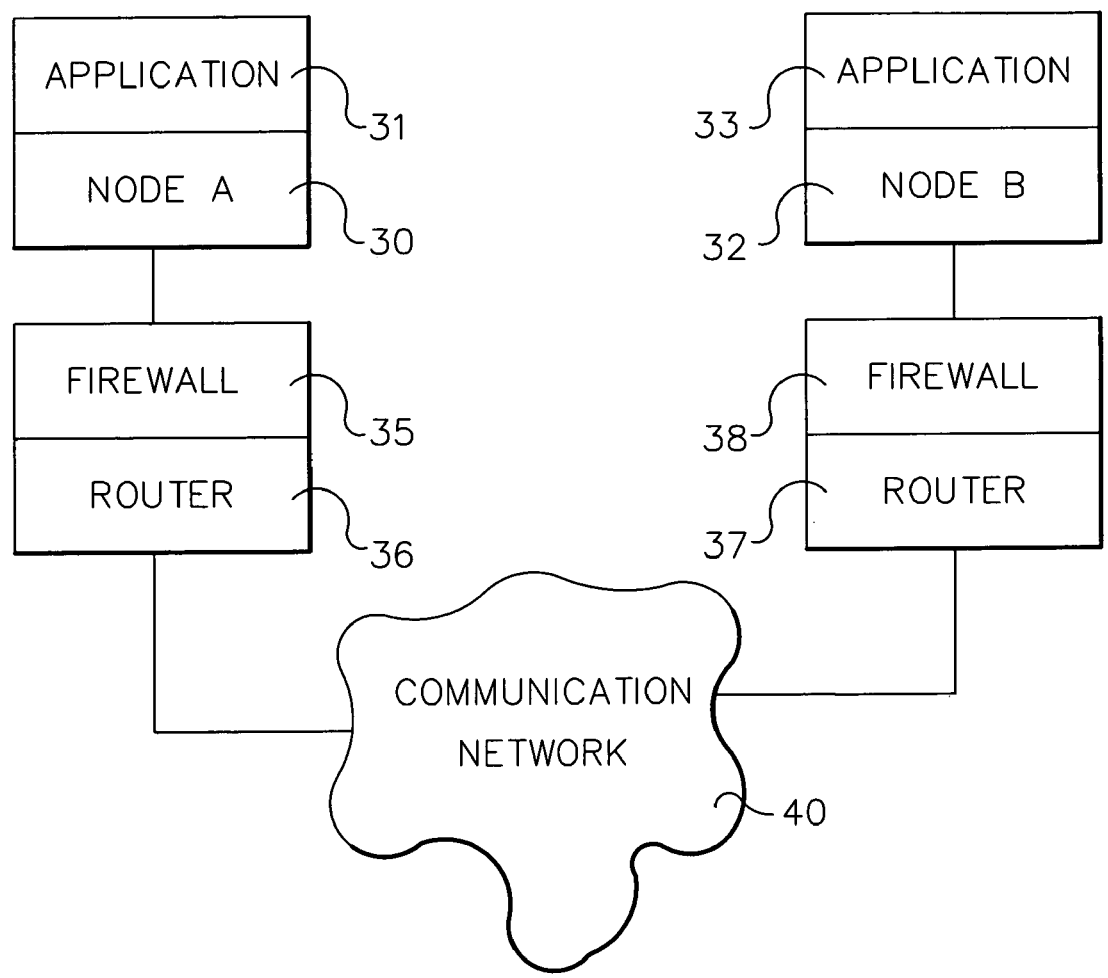
FIG. 4 illustrates a typical network system adaptable to the present invention.

IP packet filtering refers to a process that occurs in an operating system kernel implementation of, for example, the TCP/IP protocol suite. Referring to FIG. 3, as an extension to normal IP protocol functions, filtering examines each packet 140 by comparing it against a set of filter rules 166. Each filter rule 166 contains a set of 'selectors' 160, each of which specifies a certain field in the packet 140 and some set of values 164, and an operator 162 for performing a match operation. A filter rule 'matches' a packet 140 (and the packet 'matches' the filter rule) when each of that filter's selectors, when checked against the packet, returns 'true'. (A filter rule may have 0 or more selectors, each with associated operator and value set.) If the packet 140 matches a filter rule 166, some action 165 specified by the filter rule is taken. Typical actions include 'deny' (discard the packet), 'permit' (allow the packet to continue) or 'ipsec' (perform some IPsec operations for VPNs on the packet). (Other ancillary actions may be specified by a filter rule, such as logging (aka journaling) the filtering event.)

Acronyms used in the specification include:

| | |
|---|---|
| IP | Internet Protocol |
| ID | Identifier |
| sec | security |
| VPN | Virtual Private Network |
| TCP | Transmission Control Protocol |
| UDP | User Datagram Protocol |
| ICMP | Internet Control Message Protocol |

In accordance with a preferred embodiment of the inventions the syntax of a system's filter rule statements 166 are defined to include new parameters (new instances of 160, 162, and 164), and in this manner to extend IP packet filtering to allow filtering on non-IP packet 140 attributes. As illustrated in FIG. 3, a filter rule 166 comprises 0 or more of the elements 160, 162 and 164 and a single, non-optional action 165. These extended attributes include, but are not limited to, user ID, user ID attributes, user group, user group attributes, job ID, job name, job attributes, job class and job class attributes. Some details would vary per system, like the preferred name of the parameter or how its values are specified, but the general idea holds everywhere. In general, any data in the operating system kernel, either context data regarding the packet itself (e.g., time-of-day, or on what interface the packet arrived), or data specific to the task (thread, or 'job', or 'user-space process') that generated or will receive the packet, is available for this kernel data extension to IP filtering technology.

This is accomplished by a) extending the syntax used to write filter rules to allow specification of these non-IP packet attributes, and b) extending the filtering function which runs in the system kernel 30 to handle these new attributes. The key to effective implementation is that the filtering code executing in the system kernel 30 would have access to this non-IP packet data via access to non-TCP/IP protocol stack portions of the system kernel 30.

So, for example, a VPN tunnel is typically set up today between two IP addresses. Current capability also allows specification of port numbers, which would limit traffic to the application bound to those ports, at each end of the VPN tunnel. Now, with these new filtering attributes, the traffic could be controlled further, to ensure that only a particular job, or class of jobs, or particular user ID, or user group, could send and receive data using the VPN tunnel.

This gives administrators the ability to effectively implement system-wide communication controls, based on user-group attributes, job attributes, etc. For example, platinum credit card holders and gold credit card customers could be in different user groups. Hence, different characteristics for these groups is available via IP filtering. And, of course, the filters may be generated for the customer, based on high-level configuration.

Several advantages accrue. For example, the advantages of using packet filtering rather than building controls into the application are that applications 31 don't have to change, controls are centralized in the system 30 in the filter rules, and filtering technology is typically delivered with infrastructure essential to security context such as logging, auditing, controls over filter rule load, and so forth.

Referring to FIG. 3, the phrase 'defined to include new parameters' means; change the syntax of filter statements 166 as currently expressed, to accept each of the new listed parameters in the form of a selector. Each selector allows the specification of selector field 160, an operator 162, and a set 164 of values. The selector field 160 is commonly termed the 'parameter'. Details on selector value sets is not part of the invention because specifics vary across systems.

In existing filter statements, all current selector fields 160 allowed refer to some field of an IP packet 140. These new selector fields, in contrast, refer to data that does not exist in IP packets. (Does not exist in TCP/IP packet headers. Some of these selector fields may, in some cases, appear in the data portion 154 of an IP packet. But since this is very application-specific, and nonstandard, subject to change at any time (etc.), it is not used for filtering, except in special cases.)

A representative (and non-exhustive) list of the new parameters for selector fields 160 is as follows:

userid
user profile
user class
user group
user group authority
user special authority
job name
process name
task name
job group
job class
job priority other job or process attributes
date & time
(Again, these are representative names, because they vary across systems. A particular representative name may not apply to a given system. But all servers, application platforms and client systems embed these or similar concepts.)

Following are some examples of how selected parameters could be represented in filter statement parameters. (Again, specific syntactical details will vary from platform to platform, but these are not relevant to the invention.) Filter statements are part of the overall user interface to the system.
1. filter set eth01 destip=p.q.r.s . . . usergroup={ staff1, admin2 }
2. filter set eth01 sourceip=a.b.c.d . . . jobname=designserver1
3. userprofile={ georgeat, trk, besmith }
4. filter set eth01 destip=a.b.c.d . . . date=5/1–30/2001
5. filter set eth01 inbound . . . specialauthority=*iosyscfg The filtering system and method of the preferred embodiment of the invention exists and executes within node 30, 32 hosts, at least in part, where tests involve getting required information for data available in the kernel.

For outbound packet processing, say from application 31 outbound through node 30 to node 32, a packet 140 is received in the kernel of the operating system of node A 30. This packet is processed by determining the task (or thread) ID, based on the task (or thread) ID determining work control block, from the work control block, determining a process or job identifier, from that identifier determining user space job or process attributes. An alternative path involves determining the user ID from the work control block, and from the user ID control block determining the attributes for that user.

For inbound packet processing, there is an additional initial step required to determine the target application. Whereas in outbound processing, typically some kernel thread is running on behalf of a user application or process that is sending data out and that thread is readily determined, that is not true on inbound. An inbound datagram has nothing to do with a currently running application. Once that application is determined, then inbound packet processing continues as above described for outbound processing.

To determine the target application 31 for inbound processing, a look-ahead function is executed. According to that look-ahead function, the filter function asks the sockets layer to identify the application 31 to which it would give the packet, but that packet is at this point in the process marked as non-deliverable. This look-ahead has a minor runtime cost (say, in CPU cycles), but much less than executing a proxy server 34.

Outbound Packet Processing

Figure 5:
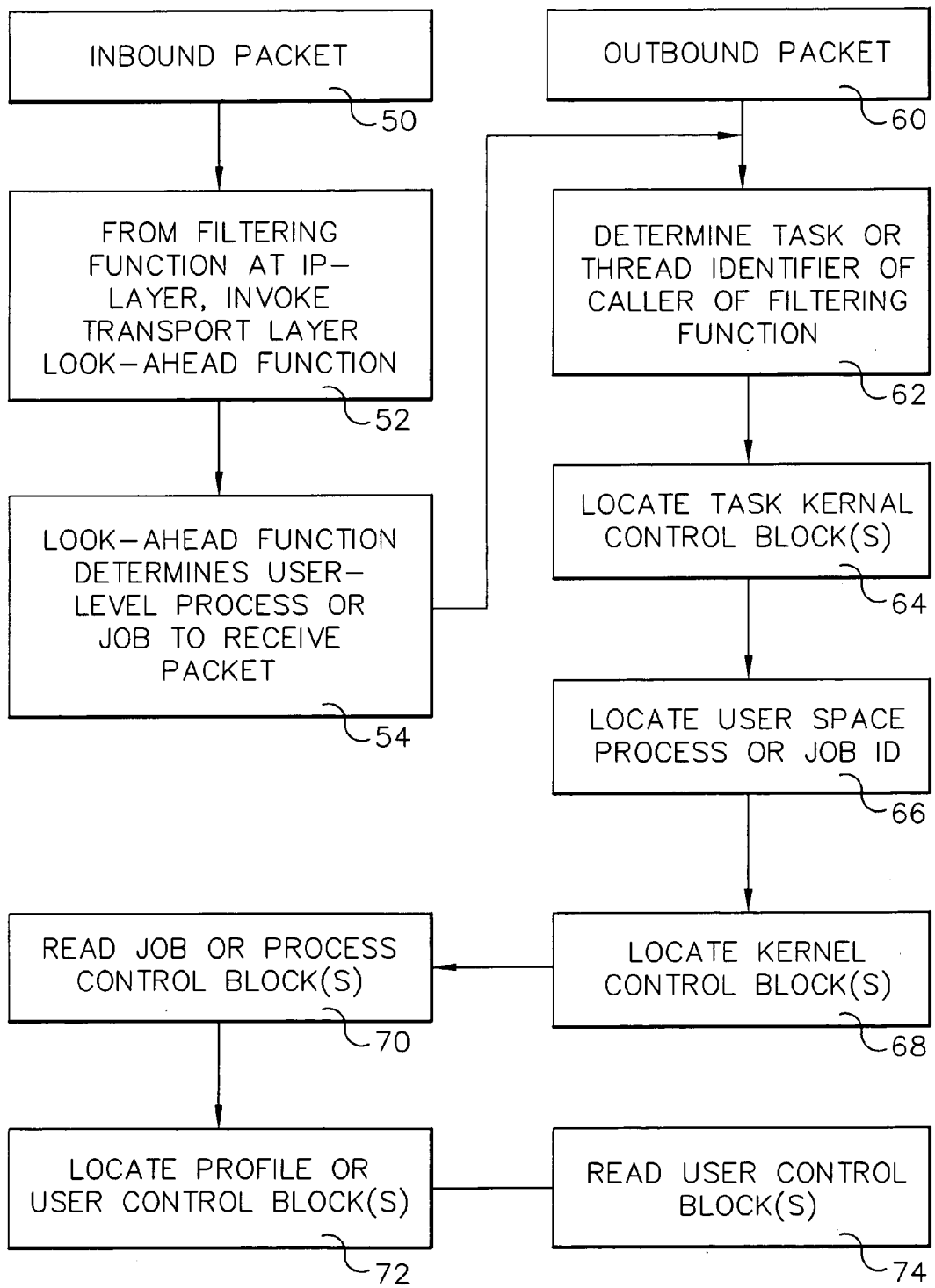
FIG. 5 is a flow diagram illustrating the method steps of an illustrative embodiment of the invention.

Referring to FIG. 5, in accordance with a preferred embodiment of the invention, steps 60–74 illustrate the method steps executed in support of outbound packet 60 processing. Low-level details on these steps are necessarily system-specific since they involve internal operating system kernel implementation details. However, the steps shown are generally applicable. These steps would be executed as part of kernel IP filtering function, when that filtering function encountered one of the new selector fields (listed above) in a filter statement.

In step 62, for outbound packet, determine the task or kernel thread identifier. This will the task of the caller for the filtering function.

In step 64, locate the kernel control block for that task.

In step 66, locate, via the task control block, the user-space process or job id associated with the task.

In step 68, locate the kernel control block for the user-space process or job id.

In step 70, read, as needed (depending on which selector field is being processed) the needed information from the job or process control block.

In steps 72 and 74, if required, locate the profile or user id control block associated with the job or process and read the needed information concerning the user from this control block.

For both inbound and outbound filters, a cache of recently referenced non-IP data can be considered so as to lesson the CPU cost of accessing the non-IP data.

Figure 6:
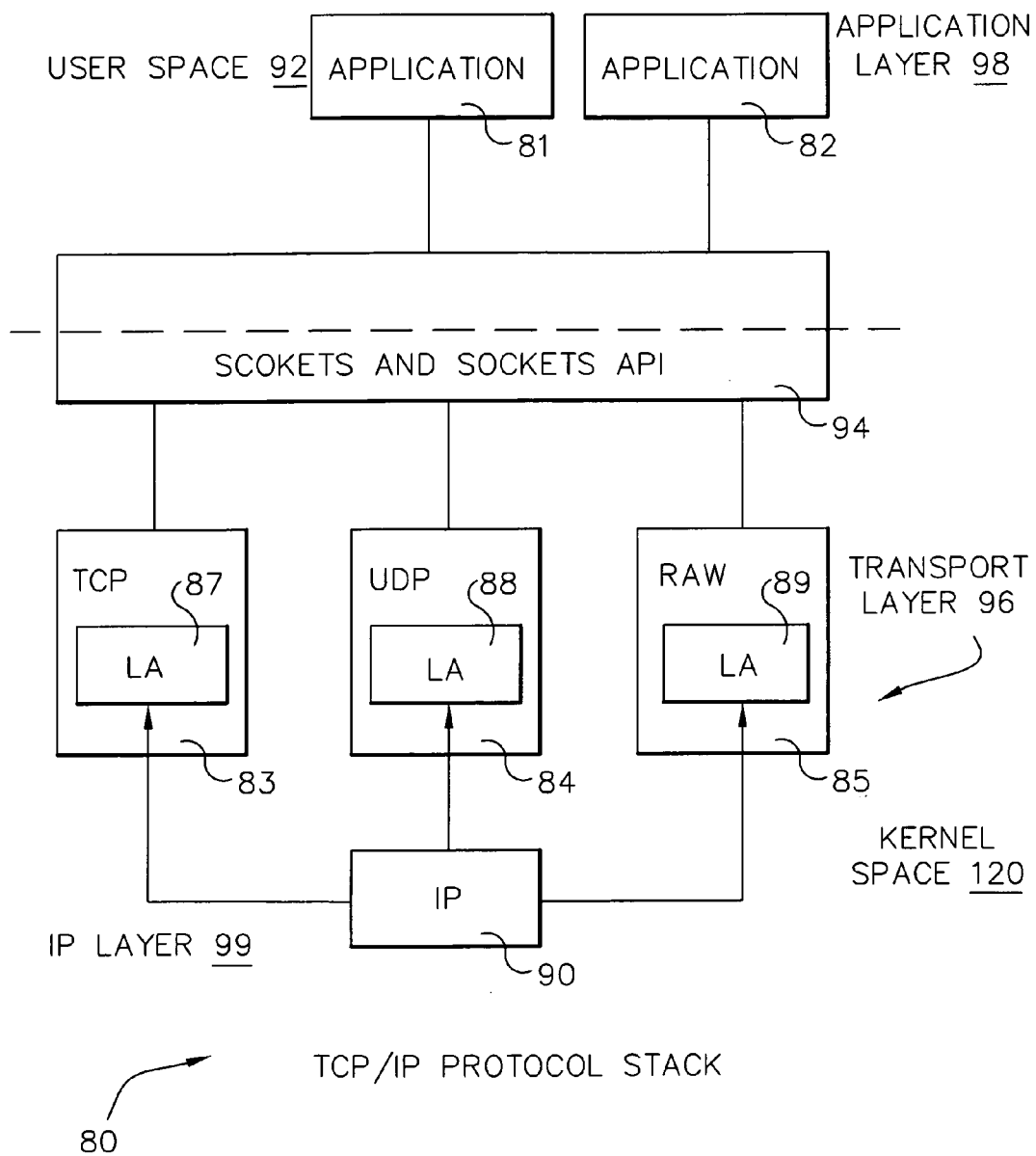
FIG. 6 is a high level architecture drawing illustrating how the look-ahead function of an illustrative embodiment of the invention fits within the TCP/IP protocol stack architecture of a system node 30, 32 of FIG. 4.

Referring further to FIG. 5, in connection with FIG. 6, which describes how the look-ahead function described hereafter fits within the TCP/IP protocol stack 80, architecture inbound packet 50 processing differs from outbound packet 60 processing primarily in that the task of the caller of filtering is not identified to a user-space 92 process 81, 82, etc., that should receive packet 50. This inbound processing only applies to packets destined for the system doing the filtering, and requires a new IP-level function 100.

In step 52, from the filtering function 90 at the IP-layer 99, invoke a new transport-layer 96 TCP 83, UDP 84, or RAW 85 'look-ahead' (LA) function 87–89, respectively, by passing the transport-layer 96 header and, if necessary, also the IP protocol 99 header. Which transport-layer 96 look-ahead function 83–85 to call is determined by the IP layer 99 header ip_p field. The selected look-ahead function 83–85 determines which user-level process or job 81–82, . . . , will receive the packet later, when the packet is sent to the transport layer 96. The task id of the corresponding process 81–82 is returned.

Steps 62–74 described above for outbound processing are now invoked, and function for inbound as well as outbound.

U.S. Pat. No. 6,182,228 describes how to generate filtering code that executes in the operating system (OS) kernel 120 from customer-entered rules.

Figure 1:
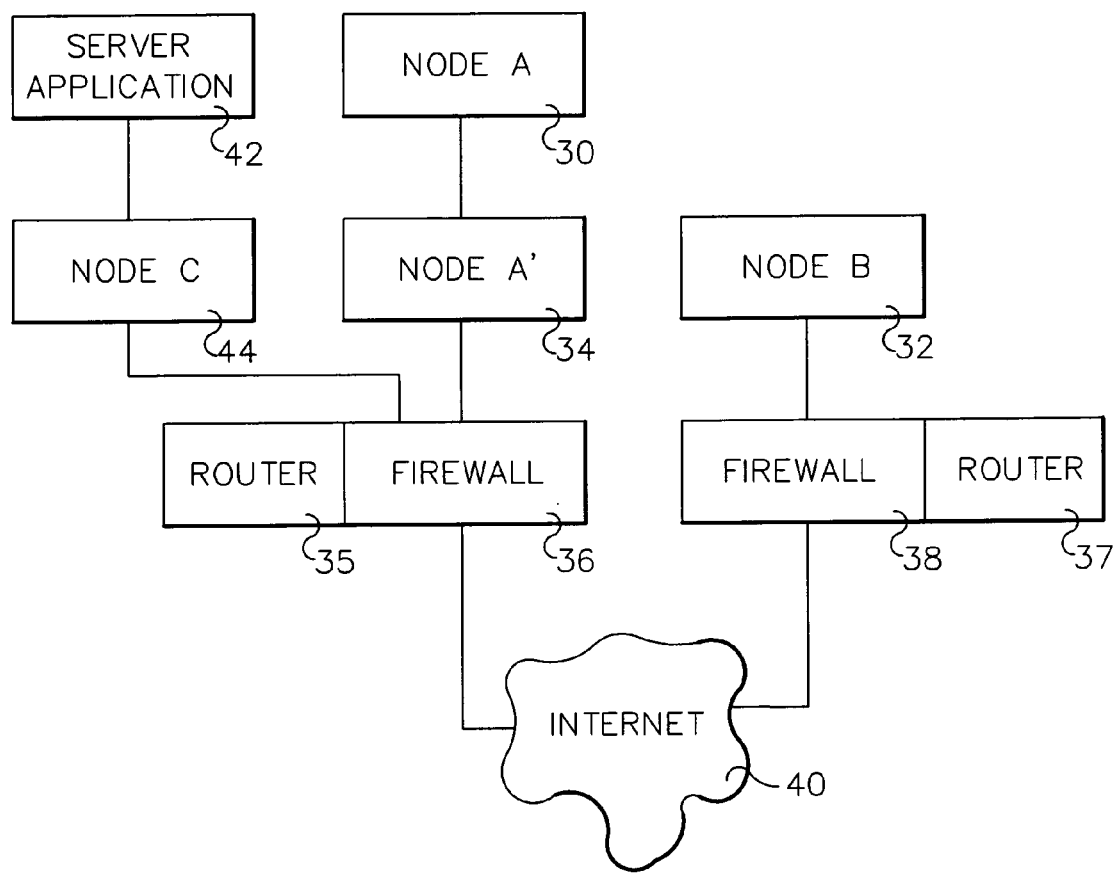
FIG. 1 illustrates various prior art network configurations.
Figure 2:
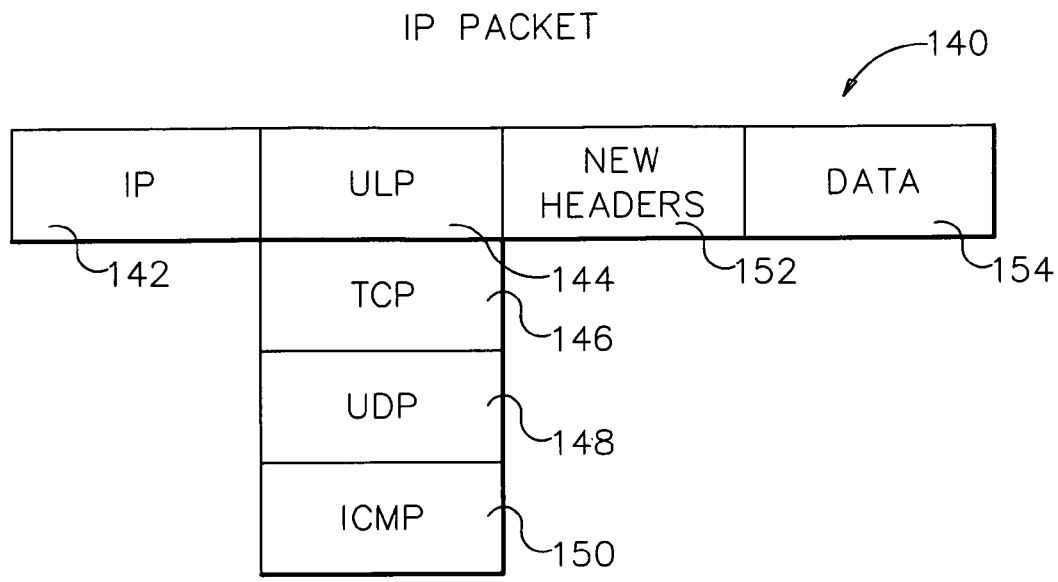
FIG. 2 illustrates the basic structure and format of an IP packet.
Figure 7:
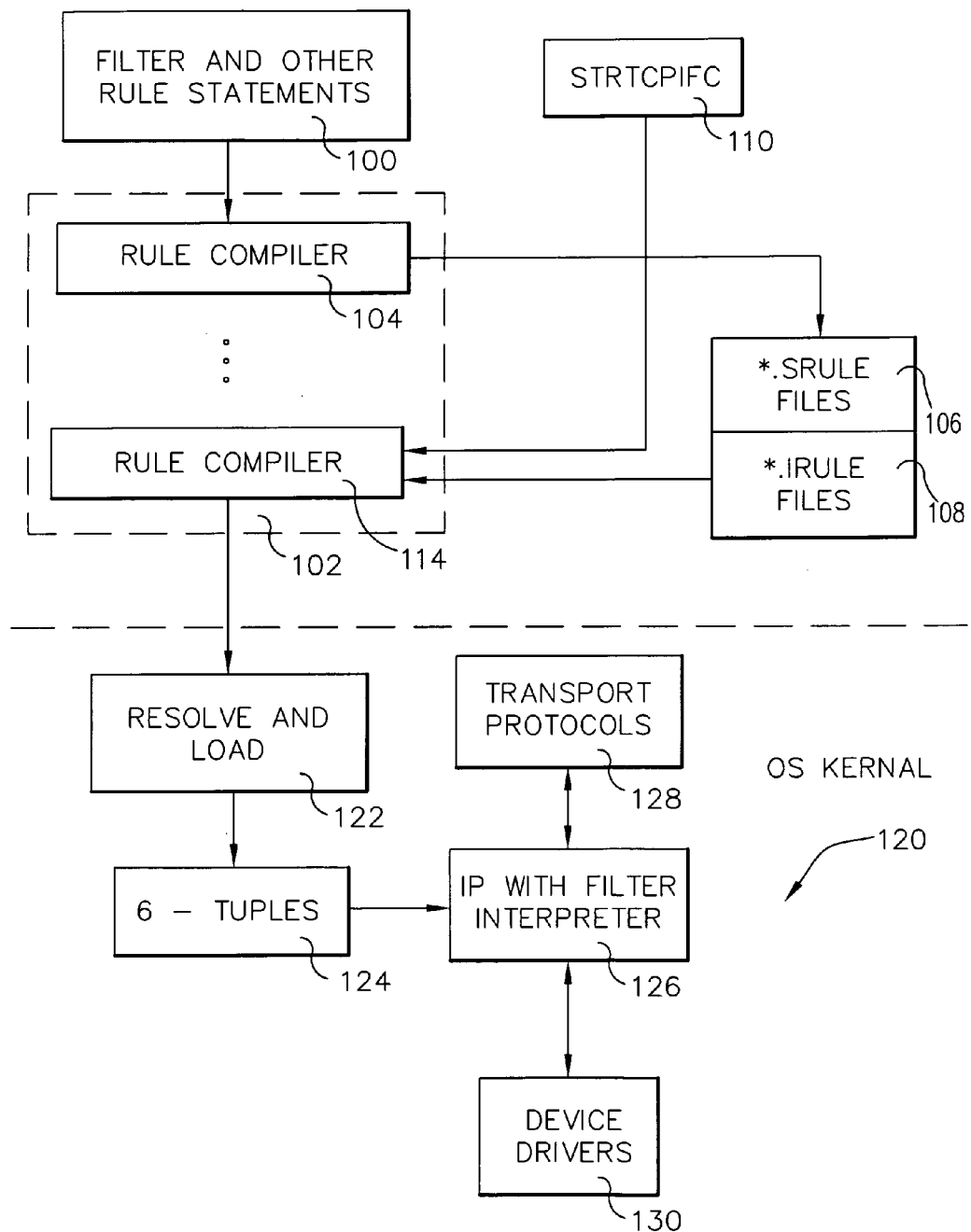
FIG. 7 illustrates key elements and the logical relationships and data flow among them for translating FILTER statements to a 6-tuple representation and interpreting them as IP datagrams flow through the OS kernel 120. See FIG. 1 of U.S. Pat. No. 6,182,228.

Referring to FIG. 7, which is FIG. 1 of U.S. Pat. No. 6,182,228,the key elements and logical relationships and data flow among them, are illustrated for translating FILTER statements 100 to a 6-tuple representation 124, and interpreting them as IP datagrams flow through the OS kernel 120. FILTER (and other rule) statements 100 are processed by rule compiler 102. An output of a first invocation 104 of the rule compiler 102 is two sets of files, s-rule files 106 and i-rule files 108. These files 106, 108 contain the binary form of the rules in image format (in i-rule files 108) or retain some symbolic information (in s-rule files 106). An 'i' or 's' rule file 106, 108 is generated for each physical interface for which there are rules. Later, when the interface is started in response to start TCP interface (STRTCPIFC) command processing 110, a second invocation 114 of rule compiler 102 completes resolution of s-rule files 106. As is represented by step 122, the resolved rules are loaded to OS kernel 120 in the form of 6-tuples. A key part of loading in the kernel is to resolve the various relative and symbolic addresses in 6-tuples to absolute addresses. Thereupon, 6-tuples 124 are ready to be used by filter interpreter 126 as IP datagrams enter and leave the system via device drivers 130 to input/output processor (IOP), not shown. In a specific embodiment, IOPs provide the actual physical interface to a system, and a network cable of some type plugs into an IOP. Each IOP is represented within the OS kernal by a physical interface control block. Filter interpreter 126 communicates with such IOPs through device driver code 130 residing within kernal 120. Transport protocols 128 (such as TCP, UDP) are accessed by filter interpreter 126 is processing 6-tuples 124.

Both image rules (irules) 108 and symbolic rules (srules) 106 are in 6-tuple form, which is the output of rule compiler invocation 104, which is further described in connection with Table 2 of U.S. Pat. No. 6,182,228, above. Both irules 108 and srules 106 go through an address resolution during load 122, of the first two elements of their tuples. However, the srules 106 have an additional resolution that occurs during the compiler call 114 in connection with 122 load, but outside of kernal 120. That additional resolution is required to change certain of their value1 206 or value2 208 elements from symbolic to actual values (IP addresses.)

ADVANTAGES OVER THE PRIOR ART

It is an advantage of the invention that there is provided an improved system and method for control and management of aspects of communication traffic.

It is a further advantage of the invention that there is provided a system and method for control and management of aspects of communication traffic within filtering.

It is a further advantage of the invention that there is provided a system and method for centralizing communication management and control within filter rules.

It is a further advantage of the invention that there is provided a system and method having reduced overhead for controlling and managing communication traffic, without requiring that IP packet traffic traverse the entire protocol stack to be disallowed.

It is a further advantage of the invention that there is provided a system and method having improved consistency, with all the rules for access expressed in the same way as filters.

It is a further advantage of the invention that there is provided a system and method for managing and controlling communication traffic having improved security through visibility and coherence by centralizing the access rules and centralizing associated logging.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, P1/1, Fortran or the like. And still further, each said step, or a file or object or the like implementing each said step, may be executed by special purpose hardware or a circuit module designed for that purpose.

Further, the invention applies to any system that supports applications, such as servers or clients, as distinguished from a system that only performs TCP/IP forwarding & routing functions (that is, systems that do not have any applications, servers or clients).

Accordingly, the scope of protection of this invention is limited only by the following claims and their equivalents.

I claim:

1. A method for control and management of communication traffic, comprising the steps of:

expressing access rules as filters referencing system kernel data;

for outbound processing, determining source application indicia;

for inbound packet processing, executing a look-ahead function to determine target application indicia; said look-ahead function being executed within an IP layer of a protocol stack including said IP layer, a transport layer, a sockets layer, and an application layer and which, for said inbound packet, said IP layer provides to said transport layer said inbound packet, marked as deny, and receives back from said transport layer indicia, provided to said transport layer by said sockets layer, identifying the application layer application to which said packet would have been delivered;

responsive to said source or target application indicia, executing filter processing; said filter processing including constructing and evaluating logical expressions including non-IP packet attributes of arbitrary length, and selectively using a set of logical operators, alternative filter selector fields, and value set; and executing said determining and executing steps within a kernel filtering function upon encountering a filter selector field referencing kernel data not included in said packet.

2. The method of claim 1, wherein said protocol stack is a TCP/IP protocol stack, and said filter processing including the steps of:

determining a task or thread identifier; based on said task or thread identifier, determining a process or job identifier; and based on said process or job identifier, determining job or process attributes for filter processing.

3. The method of claim 2, further comprising the step of determining from said task identifier a work control block containing said process or job identifier.

4. The method of claim 1, wherein said protocol stack is a TCP/IP protocol stack, and said filter processing including the steps of:

determining a user identifier; and based on said user identifier, determining user attributes for filter processing.

5. The method of claim 1, wherein said protocol stack is a TCP/IP protocol stack, and further comprising the steps of:

delivering to said filters infrastructure access rules for defining security context.

6. The method of claim 5, said infrastructure including logging, auditing, and filter rule load controls.

7. A method for control and management of aspects of communication traffic within filtering, comprising the steps of:

receiving IP packet data into a TCP/IP protocol stack executing within a system kernel;

for an inbound IP packet, executing a look-ahead function within an IP layer of a protocol stack including said IP layer, a transport layer, a sockets layer, and an application layer and which, for said IP inbound packet, said IP layer provides to said transport layer said inbound IP packet, marked as deny, and receives back from said transport layer indicia, provided to said transport layer by said sockets layer, identifying the application layer application to which said packet would have been delivered; and executing filtering code within said IP layer of said system kernel with respect to non-IP packet data accessed within said system kernel outside of said TCP/IP protocol stack; said filtering code constructing and evaluating logical expressions of arbitrary length, and selectively using a set of logical operators, alternative filter selector fields, and value set.

8. The method of claim 7, said non-IP packet data including context data regarding said IP packet.

9. The method of claim 8, said context data including packet arrival interface indicia.

10. The method of claim 7, said non-IP packet data including data specific to a task generating said non-IP packet data.

11. The method of claim 7, said non-IP packet data including data specific to a task that will receive said IP packet.

12. A method for centralizing system-wide communication management and control within filter rules, comprising the steps of:

providing filter statements syntax for accepting parameters in the form of a selector, each selector specifying selector field, operator, and a set of values;

for an inbound packet, executing a look-ahead function within an IP layer of a protocol stack including said IP layer, a transport layer, a sockets layer, and an application layer and which, for said inbound packet, said IP layer provides to said transport layer said inbound packet, marked as deny, and receives back from said transport layer indicia, provided to said transport layer by said sockets layer, identifying the application layer application to which said packet would have been delivered by said sockets layer;

said selector referencing data that does not exist in IP packets;

processing said filter statements, including constructing and evaluating logical expressions of arbitrary length including non-IP packet attributes, and selectively using a set of logical operators, alternative filter selector fields, and value set;

executing said look-ahead function and processing said filter statements within a kernel filtering function upon encountering a filter selector field referencing kernel data not included in said packet.

13. The method of claim 12, wherein said protocol stack is a TCP/IP protocol stack, and said parameters selectively including userid, user profile, user class, user group, user group authority, user special authority, job name, process name, job group, job class, job priority, other job or process attributes, and date & time.

14. The method of claim 12, wherein said protocol stack is a TCP/IP protocol stack, and said filters statements being provided within, a user interface to said system.

15. The method of claim 12, wherein said protocol stack is a TCP/IP protocol stack, and further comprising the steps of:

establishing a tunnel between two IP address limiting traffic to applications bound to ports at each end of said tunnel;

said filtering code accessing filtering attributes further limiting traffic selectively to job indicia; and operating said filtering code within a kernel filtering function upon encountering a filter selector field referencing kernel data not included in said traffic.

16. A method for traversing a portion only of a protocol stack to disallow selective IP packet traffic, comprising the steps of:

receiving a packet in the system kernel of the operating system of a first node from an application, said kernel includihg a filter processor; said filter processor for constructing and evaluating logical expressions of arbitrary length including non-IP packet attributes, said logical expressions selectively including a set of logical operators, alternative filter selector fields, and value set;

for inbound packet processing to a first node from a second node, executing a look-ahead function in an IP layer of said system kernel of said first node to determine a target application; said system kernel including a TCP/IP protocol stack including said IP layer, a transport layer, a sockets layer, and an application layer and which, for said inbound packet, said IP layer upon encountering a filter selector field referencing kernel data not included in said inbound packet provides to said transport layer said inbound packet, marked as deny, and receives back from said transport layer source application indicia identifying the application layer application to which said packet would have been delivered;

for both said inbound packet processing, and for outbound packet processing from said first node to said second node, executing within said kernel the steps of processing said packet by determining a task ID;

responsive to said task ID, determining a corresponding work control block;

determining a user ID, process or job identifier from said work control block;

from the user ID, process or job identifier selectively determining attributes for said user process or job; and passing said attributes to said filter processor for managing and controlling communication traffic.

17. A method for expressing access rules as filters, comprising the steps of:providing a filter statements syntax for accepting parameters in the form of a selector, each selector specifying selector field, operator, and a set of values; and said selector referencing data within a system kernel outside of a protocol stack that does not exist in IP packets for controlling access to an application;

for an inbound IP packet, executing a look-ahead function within the IP layer of said protocol stack, said protocol stack including said IP layer, a transport layer, a sockets layer, and an application layer and which, for said IP inbound packet, said look-ahead function in said IP layer upon encountering a filter selector field referencing kernel data not included in said inbound IP packet provides to said transport layer said inbound IP packet, marked as deny, and receives back from said transport layer indicia, provided to said transport layer by said sockets layer, identifying the application layer application to which said packet would have been delivered; and processing said filter statements within said IP layer of said protocol stack with respect to non-IP packet data accessed within said system kernel outside of said protocol stack by constructing and evaluating logical expressions including non-IP packet attributes of arbitrary length, said logical expressions selectively including a set of logical operators, alternative filter selector fields, and value set referencing said application layer application.

18. A method for managing and controlling communication traffic by centralizing access rules in filters including non-IP packet attributes executing within and referencing data available in system kernels outside of a protocol stack having an IP layer, a transport layer, and a sockets layer, comprising the steps for outbound packet processing from a first node to a second node of:
   receiving said packet in the kernel of the operating system of said first node from an application or process at said first node;
   processing said packet by determining a task ID;
   responsive to said task ID, determining a corresponding work control block;
   responsive to said work control block, determining a process or job identifier;
   responsive to said process or job identifier, determining job or process attributes; and
   executing said filters within said IP layer with respect to non-IP packet data accessed within said system kernel outside of said protocol stack by constructing and evaluating logical expressions of arbitrary length, said logical expressions selectively including a set of logical operators, alternative filter selector fields, and value set.

19. The method of claim 18, further comprising the steps for inbound packet processing from said second node to said first node of:
   initially operating said kernel at said first node upon encountering a filter selector field referencing kernel data not included in said inbound packet to determine a target application for said inbound packet at said first node by executing a look-ahead function within said IP layer of said protocol stack and which, for said inbound packet, said IP layer provides to said transport layer said inbound packet, marked as deny, and receives back from said transport layer indicia, provided to said transport layer by said sockets layer, identifying the application layer application to which said packet would have been delivered.

20. A method for managing and controlling communication traffic by centralizing the access rules, comprising the steps for outbound packet processing from a first node to a second node of:
   receiving said packet in the system kernel of the operating system of said first node from an application or process at said first node, said kernel including a filter processor for constructing and evaluating logical expressions including non-IP packet attributes of arbitrary length, said logical expressions selectively including a set of logical operators, alternative filter selector fields referencing kernel data outside of a protocol stack, and value set, said protocol stack including an IP layer, a transport layer, a sockets layer, and an application layer;
   processing said packet within said IP layer including referencing non-protocol stack portions of said system kernel;
   by determining a task ID;
   responsive to said task ID, determining a corresponding work control block;
   determining a user ID control block from said work control block;
   from the user ID control block determining attributes for said user; and
   passing said attributes to said filter processor for managing and controlling communication traffic.

21. The method of claim 20, further comprising the steps for inbound packet processing from said second node to said first node of:
   initially operating said kernel at said first node to determine a target application for said packet at said first node by executing a look-ahead function within said IP layer of said TCP/IP protocol stack, said TCP/IP protocol stack including said IP layer, a transport layer, a sockets layer, and an application layer and which, for said inbound packet, said IP layer provides to said transport layer said inbound packet, marked as deny, and receives back from said transport layer indicia, provided to said transport layer by said sockets layer, identifying the application layer application to which said packet would have been delivered.

22. A method for control and management of communication traffic with respect to a system node, comprising the steps of:
   receiving at said system node an inbound packet;
   executing within a protocol stack of the system kernel of said system node a filtering function identifying for said inbound packet a filter including non-IP packet attributes referencing non-packet data, and constructing and evaluating logical expressions of arbitrary length, said logical expressions selectively including a set of logical operators, alternative filter selector fields, and value set;
   responsive to said filter, executing a look-ahead function for identifying a target application for said inbound packet; said look-ahead function executed within the IP layer of a protocol stack including said IP layer, a transport layer, a sockets layer, and an application layer and which, for said IP inbound packet, said IP layer provides to said transport layer said inbound packet, marked as deny, and receives back from said transport layer indicia, provided to said transport layer by said sockets layer, identifying the application layer application to which said packet would have been delivered; and
   executing said filtering function and said look-ahead function within said kernel upon encountering a filter selector field referencing kernel data not included in said packet.

23. The look-ahead function of the method of claim 22 wherein said protocol stack is a TCP/IP protocol stack, and further comprising the steps of:
   passing to a transport layer function identified by an IP header a packet marked deny for determining which user-level process or job is to receive said packet;
   receiving from said transport layer an application layer task identifier for said user-level process or job; and thereafter
   passing said packet marked by said task identifier to said transport layer for delivery to said application layer task.

24. System for control and management of communication traffic, comprising:
   a system kernel including a filter function and stack data;
   said filter function including a filter including non-IP packet attributes selectively referencing said stack data for expressing access rules;
   said filter function being responsive to receipt of an outbound packet for determining a source application;
   said filter function being responsive to receipt of an inbound packet including a filter selector field referencing kernel data not included in said inbound packet for executing a look-ahead function within the IP layer of a TCP/IP protocol stack to determine a target application; said protocol stack including said IP layer, a transport layer, a sockets layer, and an application layer and which, for said inbound packet, said IP layer provides to said transport layer said inbound packet, marked as deny, and receives back from said transport layer indicia, provided to said transport layer by said sockets layer, identifying the application layer application to which said packet would have been delivered; and said filter function being responsive to said source or target application for executing filter processing including constructing and evaluating logical expressions of arbitrary length, said logical expressions selectively including a set of logical operators, alternative filter selector fields referencing kernel data not included in a packet, and value set.

25. A system for control and management of aspects of communication traffic within filtering, comprising:

a system kernel;

a protocol stack including an IP layer, a transport layer, a sockets layer, and an application layer for executing within said IP layer of said system kernel, responsive to an inbound IP packet, a look-ahead function by which said IP layer provides to said transport layer said inbound IP packet, marked as deny, and receives back from said transport layer indicia, provided to said transport layer by said sockets layer, identifying the application layer application to which said packet would have been delivered; and filtering code within said system kernel operable with respect to non-IP packet data accessed within said system kernel outside of said protocol stack for controlling and managing said aspects of communication traffic; said filter code for constructing and evaluating logical expressions of arbitrary length including non-IP packet attributes, said logical expressions selectively including a set of logical operators, alternative filter selector fields, and value set.

26. A system for centralizing system-wide communication management and control within filter rules including non-IP packet attributes, comprising:

filter statements having a syntax for accepting parameters in the form of a selector, each selector specifying selector field, operator, and a set of values;

said selector referencing data that does not exist in IP packets;

a look-ahead function within the IP layer of a protocol stack including said IP layer, a transport layer, a sockets layer, and an application layer, which look-ahead function, responsive to encountering a filter selector field in an inbound packet referencing kernel data not included in said inbound packet, executes within said IP layer to provide to said transport layer said inbound packet, marked as deny, and receive back from said transport layer indicia, provided to said transport layer by said sockets layer, for identifying the application layer application to which said packet would have been delivered; and a filter processor for constructing and evaluating filter statements including logical expressions of arbitrary length, said logical expressions selectively including a set of logical operators, alternative filter selector fields selectively referencing non-IP packet data accessed within said system kernel outside of said protocol stack, and value set.

27. A system for traversing a portion only of a TCP/IP protocol stack to disallow selective IP packet traffic, comprising:

a system kernel;

a filter processor executing within said system kernel for constructing and evaluating logical expressions of arbitrary length, said logical expressions selectively including a set of logical operators, alternative filter selector fields selectively referencing non-packet data accessed within said system kernel outside of said TCP/IP protocol stack, and value set;

said filter processor responsive to an inbound packet for executing within an IP layer of said TCP/IP protocol stack a look-ahead function for determining a target application; said TCP/IP protocol stack including said IP layer, a transport layer, a sockets layer, and an application layer; and which, for said inbound packet, upon encountering a filter selector field referencing kernel data not included in said inbound packet, said IP layer provides to said transport layer said inbound IP packet, marked as deny, and receives back from said transport layer indicia, provided to said transport layer by said sockets layer, identifying the application layer application to which said packet would have been delivered;

said filter processor responsive to both inbound and outbound packets for processing said packet by determining a task ID;

responsive to said task ID, determining a corresponding work control block;

determining a user ID, process or job identifier from said work control block;

from the user ID, process or job identifier selectively determining attributes for said user process or job; and passing said attributes to said filter processor for managing and controlling communication traffic.

28. A system for expressing access rules as filters, comprising:

filter statements for accepting parameters in the form of a selector, each selector specifying selector field, operator, and a set of values;

said selector referencing data that does not exist in IP packets for controlling access to an application;

a look-ahead function executing within the IP layer of a protocol stack including said IP layer, a transport layer, a sockets layer, and an application layer and which, for an inbound packet upon encountering a filter selector field referencing kernel data not included in said inbound packet, said look-ahead function provides to said transport layer said inbound packet, marked as deny, and receives back from said transport layer indicia, provided to said transport layer by said sockets layer, identifying the application layer application to which said packet would have been delivered; and a filter processor for constructing and evaluating said filter statements as logical expressions of arbitrary length, each said logical expression selectively including said operator selected from a set of logical operators, alternative filter selector fields including non-IP packet attributes, and value set.

29. A system for managing and controlling communication traffic by centralizing access rules in filters including non-IP packet attributes executing within and referencing data available in system kernels, comprising:

a computer readable medium; first code for receiving a packet in the kernel of the operating system of a first node from an application or process at said first node; said kernel responsive to an inbound packet, for executing a look-ahead function within the IP layer of a TCP/IP protocol stack including said IP layer, a transport layer, a sockets layer, and an application layer and which, for said inbound packet, upon encountering a filter rule referencing kernel data not included in said inbound packet, said look-ahead function provides to said transport layer said inbound IP packet, marked as deny, and receives back from said transport layer indicia, provided to said transport layer by said sockets layer, identifying the application layer application to which said packet would have been delivered;

second code for processing said packet by determining a task ID;

third code responsive to said task ID for determining a corresponding work control block;

fourth code responsive to said work control block for determining a process or job identifier;

fifth code responsive to said process or job identifier for determining job or process attributes;

sixth code for executing said filters by constructing and evaluating logical expressions of arbitrary length, said logical expressions selectively including a set of logical operators, alternative filter selector fields, and value set; and wherein said first, second, third, fourth, fifth, and sixth code is recorded on said computer readable medium.

30. A system for control and management of communication traffic with respect to a system node, comprising:

a filtering function executing within the IP layer of a protocol stack of the system kernel of said system node identifying for an inbound packet a filter referencing non-packet data within said system kernel and outside of said protocol stack;

a look-ahead function responsive to said filter referencing non-packet data within said system kernel and outside of said protocol stack for identifying a target application for said inbound packet; said look-ahead function functioning within said IP layer of said protocol stack including said IP layer, a transport layer, and a sockets layer, and which, for said inbound packet, said IP layer provides to said transport layer said inbound packet, marked as deny, and receives back from said transport layer indicia, provided to said transport layer by said sockets layer, identifying the application to which said packet would have been delivered; and a filter processor for constructing and evaluating logical expressions of arbitrary length, said logical expressions selectively including a set of logical operators, alternative filter selector fields, and value set.

31. A computer program product for control and management of aspects of communication traffic within filtering, said computer program product comprising:

a computer readable medium;

first program instructions to receive IP packet data into a TCP/IP protocol stack executing within a system kernel including, for processing an inbound IP packet, a look-ahead function within the IP layer of a protocol stack including said IP layer, a transport layer, a sockets layer, and an application layer and which, for said IP inbound packet, upon encountering a filter selector field referencing kernel data not included in said inbound IP packet, said IP layer provides to said transport layer said inbound IP packet, marked as deny, and receives back from said transport layer indicia, provided to said transport layer by said sockets layer, identifying the application layer application to which said packet would have been delivered;

second program instructions to execute filtering code within said system kernel with respect to non-IP packet data accessed within said system kernel outside of said TCP/IP protocol stack by constructing and evaluating logical expressions of arbitrary length, said logical expressions selectively including a set of logical operators, alternative filter selector fields, and value set; and wherein said first and second program instructions are recorded on said medium.

32. A computer program product for centralizing system-wide communication management and control within filter rules, said computer program product comprising:

a computer readable medium;

first program instructions to execute filter statements including non-IP packet attributes having a syntax for accepting parameters in the form of a selector, each selector specifying selector field, a logical operator selected from a set of a plurality of logical operators, and a set of values; and second program instructions to cause said selector to reference data within an operating system kernel outside, of a protocol stack and that does not exist in IP packets, said data including application layer indicia obtained for an incoming packet by a look-ahead function; said look-ahead function executing within the IP layer of a protocol stack including said IP layer, a transport layer, a sockets layer, and an application layer and which, upon encountering a selector field referencing kernel data not included in said IP inbound packet, said look-ahead function provides to said transport layer said inbound IP packet, marked as deny, and receives back from said transport layer indicia, provided to said transport layer by said sockets layer, identifying the application layer application to which said packet would have been delivered; and wherein said first and second program instructions are recorded on said medium.

33. A computer program product for managing and controlling communication traffic by centralizing access rules in filters including non-IP packet attributes executing within and referencing data available in system kernels, said computer program product comprising:

a computer readable medium;

first program instructions to receive said packet in the kernel of the operating system of said first node from a process at said first node;

second program instructions to process said packet by determining a task ID;

third program instructions, responsive to said task ID, to determine a corresponding work control block;

fourth program instructions, responsive to said work control block, to determine a process or job identifier;

fifth program instructions, responsive to said process or job identifier, to determine job or process attributes; and sixth program instructions to execute a filter processor within the IP layer of a protocol stack for constructing and evaluating logical expressions of arbitrary length, said logical expressions selectively including a set of logical operators, alternative filter selector fields referencing non-IP packet attributes for accessing data within said system kernels and outside of said protocol stack, and value set; and wherein said first, second, third, fourth, fifth, and sixth program instructions are recorded on said medium.

34. The computer program product of claim 33, wherein said protocol stack is a TCP/IP protocol stack, and said computer program product further comprising for inbound packet processing from said second node to said first node:

seventh program instructions to initially operate said kernel at said first node to determine a target application for said packet at said first node by executing a look-ahead function within the IP layer of a protocol stack including said IP layer, a transport layer, a sockets layer, and an application layer and which, for said IP inbound packet, said IP layer provides to said transport layer said inbound IP packet, marked as deny, and receives back from said transport layer indicia, provided to said transport layer by said sockets layer, identifying the application layer application to which said packet would have been delivered; and wherein said seventh program instructions are recorded on said medium.

35. A computer program product for control and management of communication traffic, comprising:

a computer readable medium;

first program instructions for expressing access rules as filters including non-IP packet attributes referencing system kernel data outside of a protocol stack;

second program instructions, for outbound processing, for determining a source application;

third program instructions, for inbound packet processing, for executing a look-ahead function to determine a target application; said look-ahead function operating within the IP layer of said protocol stack, said protocol stack including said IP layer, a transport layer, a sockets layer, and an application layer and which, for said IP inbound packet, upon encountering a filter selector field referencing kernel data not included in an inbound packet, said look-ahead function provides to said transport layer said inbound IP packet, marked as deny, and receives back from said transport layer indicia, provided to said transport layer by said sockets layer, identifying the application layer application to which said packet would have been delivered;

fourth program instructions, selectively responsive to said source and target applications, and upon encountering a filter selector field referencing kernel data not included in said inbound packet for executing filter processing including constructing and evaluating logical expressions of arbitrary length, said logical expressions selectively including a set of logical operators, alternative filter selector fields, and value set; and wherein said first, second, third, and fourth program instructions are recorded on said computer readable medium.

36. A computer program product for control and management of aspects of communication traffic within filtering, comprising:

a computer readable medium;

first program instructions for receiving IP packet data into a TCP/IP protocol stack including an IP layer executing within a system kernel;

second program instructions for executing filtering code within said IP layer of said system kernel with respect to non-IP packet data accessed within said system kernel outside of said TCP/IP protocol stack;

said filtering code constructing and evaluating logical expressions of arbitrary length, said logical expressions selectively including a set of logical operators, alternative filter selector fields including non-IP packet attributes, and value set; and wherein said first and second program instructions are recorded on said computer readable medium.

37. A computer program element for centralizing system-wide communication management and control within filter rules, comprising:

a computer readable medium;

first program instructions for providing filter statements syntax for accepting parameters in the form of a selector, each selector specifying selector field, a logical operator, and a set of values, second program instructions for executing filtering by constructing and evaluating logical expressions of arbitrary length, said logical expressions selectively including said logical operator selected from a set of logical operators, at least one said selector field including non-IP packet attributes accessed within a system kernel and outside of a protocol stack, and at least one said value;

said selector referencing data that does not exist in IP packets including data obtained, for an inbound IP packet, by executing a look-ahead function within the IP layer of said protocol stack, said protocol stack including said IP layer, a transport layer, a sockets layer, and an application layer, and which, for said IP inbound packet, upon encountering a selector field referencing kernel data not included in said inbound IP packet, said look-ahead function provides to said transport layer said inbound IP packet, marked as deny, and receives back from said transport layer indicia, provided to said transport layer by said sockets layer, identifying the application layer application to which said packet would have been delivered; and wherein said first and second program instructions are recorded on said computer readable medium.

38. A computer program product for managing and controlling communication traffic by centralizing access rules in filters on non-IP packet attributes executing within, and referencing data available in, system kernels, comprising:

a computer readable medium;

first program instructions for receiving said packet in the system kernel of the operating system of said first node from an application or process at said first node;

second program instructions for processing said packet by determining a task ID;

third program instructions, responsive to said task ID, for determining a corresponding work control block;

fourth program instructions, responsive to said work control block, for determining a process or job identifier;

fifth program instructions, responsive to said process or job identifier, for determining job or process attributes;

sixth program instructions for executing a filter processor within the IP level of a protocol stack with respect to non-IP packet data accessed within said system kernel outside of said protocol stack for constructing and evaluating logical expressions of arbitrary length, said logical expressions selectively including a set of logical operators, alternative filter selector fields, and value set; and wherein said first, second, third, fourth, fifth, and sixth program instructions are recorded on said computer readable medium.

39. The computer program product of claim 38, further comprising for inbound packet processing from said second node to said first node:

seventh program instructions initially operating said kernel at said first node to determine a target application for said packet at said first node by executing a look-ahead function within said IP layer of said protocol stack, said protocol stack including said IP layer, a transport layer, a sockets layer, and an application layer and which, for said IP inbound packet, said IP layer provides to said transport layer said inbound IP packet, marked as deny, and receives back from said transport layer indicia, provided to said transport layer by said sockets layer, identifying the application layer application to which said packet would have been delivered; and wherein said seventh program instructions are recorded on said computer readable medium.

* * * * *